United States Patent [19]

Keeble

[11] Patent Number: 5,205,542

[45] Date of Patent: Apr. 27, 1993

[54] OPTICAL FIBRE INSTALLATION

[75] Inventor: Peter Keeble, Ipswich, England

[73] Assignee: British Telecommunications Public Limited, London, England

[21] Appl. No.: 661,224

[22] Filed: Feb. 27, 1991

Related U.S. Application Data

[62] Division of Ser. No. 399,533, Aug. 21, 1989, Pat. No. 5,022,634.

[30] Foreign Application Priority Data

Mar. 23, 1987 [GB] United Kingdom ............... 8706803

[51] Int. Cl.$^5$ .............................................. B66F 3/24
[52] U.S. Cl. .................................................. 254/134.4
[58] Field of Search ............ 254/1, 134.4, 134.3 FT, 254/134.3 R; 15/109.06 R; 268/25, 43, 178

[56] References Cited

U.S. PATENT DOCUMENTS

| | | | |
|---|---|---|---|
| 3,283,123 | 11/1966 | Atkinson et al. | 254/134.4 |
| 4,185,809 | 1/1980 | Jonnes | 254/134.4 |
| 4,691,896 | 9/1987 | Reeve et al. | 254/134.4 |
| 4,756,510 | 7/1988 | Klamm | 254/134.4 |
| 4,856,760 | 8/1989 | Frost et al. | 254/134.4 |

FOREIGN PATENT DOCUMENTS 37076  4/1968  Australia ........................ 254/134.4

Primary Examiner—Robert C. Watson

[57] ABSTRACT

An apparatus and method for introducing a transmission line into a duct through which it is to be propelled by viscous drag of fluid propellant. A high local flow of fluid is created by inputting fluid, preferably compressed air, adjacent the input of the transmission line to the duct and bleeding a proportion of the fluid from the duct a short distance along from the input. This local flow provides the driving force to progress the transmission line along the first third of the duct against the hydrostatic potential. The extent of the venting via the bleed valve is controllable to control the driving force on the transmission line. This technique is especially useful for transmission lines including optical fibres.

17 Claims, 2 Drawing Sheets

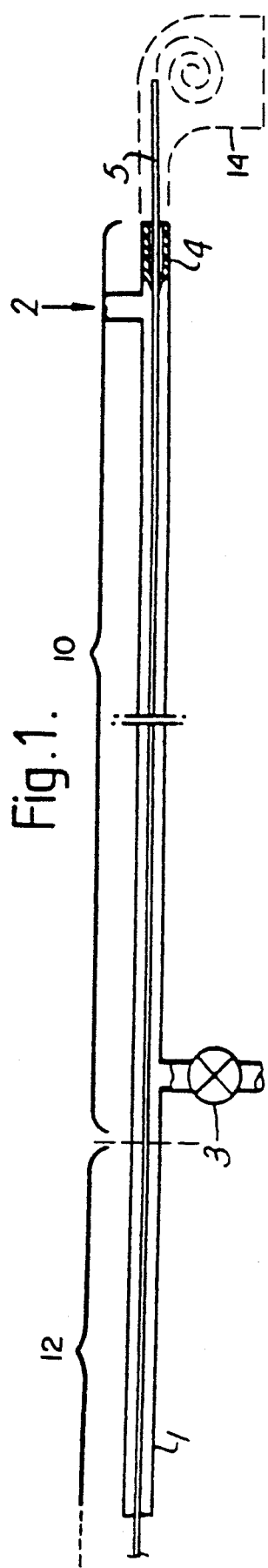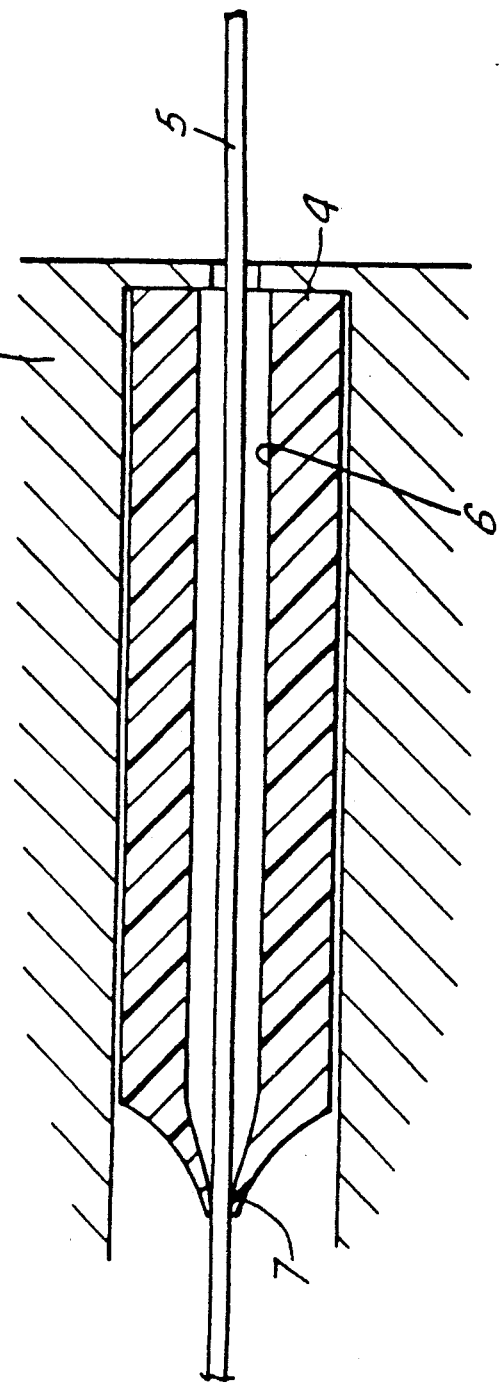

OPTICAL FIBRE INSTALLATION

This is a division of application Ser. No. 07/399,533, filed Aug. 21, 1989, now U.S. Pat. No. 5,022,639.

FIELD OF THE INVENTION

This invention relates to transmission lines and to the introduction of a transmission line into a duct through which it is to be advanced by fluid drag.

BACKGROUND OF THE INVENTION

Our European Pat. 108590 discloses a method and apparatus for installation of transmission lines within tubular ducts using fluid drag to advance the transmission line along the duct. In the preferred form of apparatus described in that specification compressed gas is used to provide the fluid drag and an optical fibre transmission line package is introduced via a feed head and feed wheels are provided to urge the fibre package into the duct against the hydrostatic potential that is experienced. Once a sufficient length of the fibre package has been inserted the fluid drag on the inserted fibre overcomes the resistance of the hydrostatic potential and the fibre is propelled by fluid drag along the duct. During such an installation procedure there is substantially continuous relative motion between the duct and the fibre package.

For in-field applications it is desirable to have mobile equipment that can easily be moved from location to location, and can be utilised in confined spaces: this is particularly important for repair work which may have to take place in remote and awkward circumstances. With the apparatus described in E.P 108590 it has been found that the feed wheels and associated drive mechanism limits the minimum size of the equipment.

A further problem that arises with positive pressure feed heads is the provision of a seal to inhibit backflow of fluid between the inlet tube for the fibre package and the fibre package itself. It is necessary for the fibre to be able to advance without being over-tensioned, but at the same time the greater than atmospheric pressure within the feed head needs to be maintained. Sealing may be particularly difficult to achieve because there can be considerable variation in cross-sectional shape and diameter of some transmission line packages, for example the tolerance on the diameter of a multi-fibre package maybe as much as ±10%. Thus if a very closely fitting collet is located around the fibre package the positive deviations in diameter may result in the package being gripped too tightly, resulting in excessive tension on the optical fibre. In practice an inefficient sealing arrangement of a collet of greater diameter than the package and sufficient to accommodate the package cross sectional variation is used, and this results in fluid propellant leakages as high as 50% occurring between the fibre and collet.

SUMMARY OF THE INVENTION

The present invention is directed towards advancing transmission lines in installation passageways, to reduce or eliminate the need for mechanical advancement, and/or to achieving greater installation distances.

Accordingly the present invention provides apparatus for advancing a transmission line along a tubular installation passageway having a transmission line input end and a transmission line output end by viscous drag of a fluid medium, the apparatus comprising an input for the transmission line, inlet means for admitting fluid medium to the installation passageway and at least one outlet means disposed downstream of the inlet means for discharging fluid medium substantially before the transmission line output end of the installation passageway.

The invention also provides a method of advancing a transmission line into an installation passageway by the viscous drag of a fluid medium, the installation passageway having a transmission line input and a transmission line output end, the method comprising the steps of admitting fluid medium to the passageway containing the transmission line and discharging fluid medium from the passageway through an outlet further along the passageway in the direction of advancement of the transmission line but substantially before the transmission line output end of the installation passageway.

BRIEF DESCRIPTION OF THE DRAWINGS

The invention is now described by way of example with reference to the accompanying drawing in which:

FIG. 1 schematically illustrates an embodiment of the invention;

FIG. 2 shows a preferred form of seal for a transmission line entry point in the embodiment of FIG. 1;

DETAILED DESCRIPTION OF THE DRAWINGS

Figure 3:
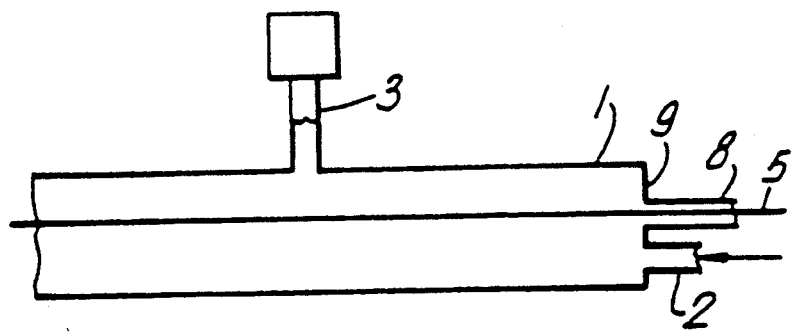
FIG. 3 shows an alternative embodiment of the invention.

In the context of this specification transmission line 'package' should be interpreted to mean any transmission line adapted for or suitable for installation by fluid drag techniques, and may for example comprise a simple transmission line, transmission lines comprising at least one optical fibre, or transmission lines having a lightweight or foamed covering for the purpose of increasing surface area to mass ratio. Such a covering may also provide suitable drag and friction characteristics and ruggedisation of the transmission line.

'Installation duct' or 'installation passageway' refers to the routes along which transmission lines are installed, such routes may for example be within buildings or over or underground, and frequently contain bends.

In FIG. 1 a tubular duct 1 is provided with a fluid inlet 2, which may be for gas or liquid but it is especially preferred to utilise compressed air and is described hereinafter in that context, a bleed valve 3 and a seal 4. The inlet 2 is located close to the end of the duct to which a transmission line package such as an optical fibre package 5 is input, and the seal 4 has a passage for the fibre package 5 and seals against the duct 1 and the fibre package 5. The bleed valve is located a short distance (compared with the overall length of duct) from the fibre input end, typically 0.5 to 3 meters from the input end.

In order to commence the installation operation, referred to as the blowing operation, the fibre package is threaded through the seal, urged a short way into the duct and then compressed air is introduced via the inlet. With fibre blowing systems it is generally necessary to urge the fibre package into the duct against hydrostatic potential created by introduction of compressed air until the package is inserted along about one third of the length of the duct, after which the fibre is propelled by viscous drag. Previously the fibre package has been pushed for this first one third of the duct by motor driven wheels. In this embodiment of the invention compressed air (typically at a pressure of about 1000 KPa (10 bar) is introduced at the inlet, but instead of all the air progressing completely through the duct a proportion (for example up to 80%) is bled off through the bleed valve to create a high local flow between the fibre input and the bleed valve. This high local flow produces sufficient driving force to push the fibre along the first third of the duct against the hydrostatic potential. Preferably the bleed valve is adjustable and the proportion of air bled through the valve is reduced as the fibre package progresses along the first third of the duct. A control means may be included which senses tension or buckling of the fibre package, and this control may be linked to increase or decrease the level of discharge through the bleed valve.

The length of duct between the fibre input and the bleed valve may be regarded as a short duct 10 connected directly to a longer duct 12, and it is envisaged that the duct prior to the bleed valve need not be integral with the main part of the duct after the bleed valve. It will be realised that the blown feed-in may be applied directly to the end of an installed duct, this being achieved either by tapping into the duct to provide the compressed air inlet and bleed valve or by attaching a length of ducting provided with an air inlet and bleed valve.

Figure 4:
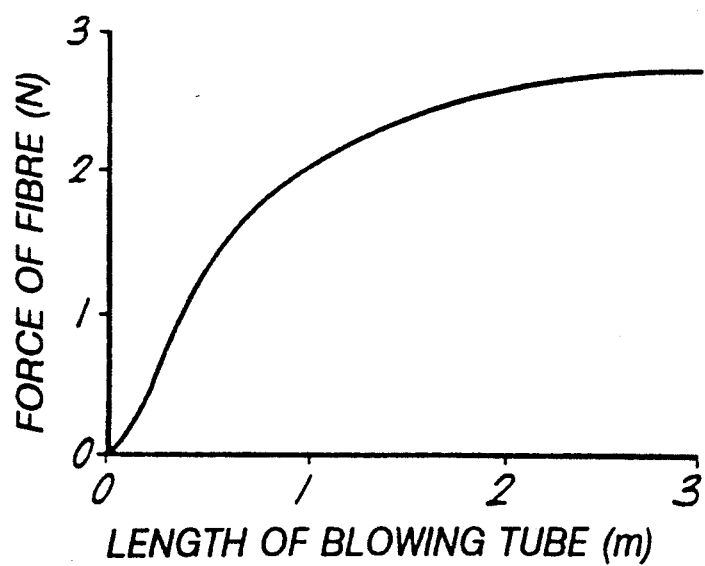
FIG.4 is a graph showing force on a transmission line against distance to a bleed valve.

It has been found in practice, and is shown in FIG. 4, that the relationship between the force that can be imparted on a fibre package and the length of the blowing tube between the air input and the vent is non-linear, and that utilising a length in the range of 1 to 2 meters is optimal: increasing the length much beyond 1.5 meters gives little additional benefit. The optimum bore diameter for the tube between the input and the bleed valve is that bore that will just maintain the output of the source or compressor at a maximum or selected value. For a 1.5 meter distance to the bleed valve and a compressor capacity of 370 L/minute it has been found that a bore of 3.8 mm is optimal: below this the bore restricts the compressor output and above this the compressor capacity is insufficient. Installation speeds in excess of 100 meters per minute, and in general in the range of 50 to 100 meters per minute can be achieved with such a blown feed.

An alternative embodiment of the invention (not shown) is for a vent to be located a substantial distance along the duct, for example at the mid point or two thirds of the way along, and for air to be bled from that vent until the transmission line has approached close to it, at which time the vent is then closed. In effect such a vent may be considered a 'temporary termination' of the duct. A series of vents that are sequentially opened and closed as the transmission line advances may also be provided. Optimally this is used in conjunction with a blown feed-in, but may be utilised with other feed-in mechanisms to improve continuous installation lengths. For very long installations the flow rate of the air may be increased by employing suction at vent locations, or additional air may be injected into the duct at intermediate locations (i.e. other than at the end) along the duct, preferably with an associated subsequent vent.

When compressed air is introduced at the end of an installation duct, it is necessary to prevent excessive backflow of air out of the duct. This may be done by restricting the passage for backflow of air by provision of narrow outlets or seals around the transmission line input. Alternatively the fibre package may be paid out from a closed unit 14 than can be sealed to the duct.

FIG. 2 illustrates in more detail the seal 4 through which the fibre package is threaded. This seal enables the fibre package to be introduced from an open source such as a reel or pan of fibre package. The seal 4 is substantially cylindrical and has a central bore 6 through which the fibre 5 is threaded. For most of its length the bore 6 is of greater diameter than the fibre 5 so that the fibre can pass freely through the bore. At the end of the seal inwardly of the tube 1 the bore of the seal tapers to closely match the diameter of the fibre 5 and the wall thickness of the seal also tapers to form a lip portion 7 closely surrounding the fibre 5. Due to the thinning of the wall of the seal there is only light resistance to the passage of fibre through the seal, and at the same time the pressure within the tube also tends to press the lips of the seal onto the fibre to form an airtight seal. Suitable choice of material hardness and dimensions enable the pressure on the lips of the seal from the compressed air to be sufficient to permit the lips to adapt to the configuration of the fibre package as it moves longitudinally through the seal so as to reduce escape of air backwards along the fibre package while at the same time presenting only slight resistance to movement of the fibre package through the seal.

If the material of the seal is too flexible the pressure can cause the fibre to be gripped too tightly. The gripping effect is minimised by keeping the area of contact between the fibre package and the seal small, just at the tip of the lips, and lubricants or low friction coatings may also be used. However, a further problem with too flexible material is that the lips can become inverted, that is blown inwardly of the seal, when high blowing pressures are used. Suitable plastics include Hyperlast 2851/106, a polyurethane elastomer supplied by B and T Polymers and PVCs such as VX329 made by British Plastics Industry Ltd. Other VX types of PVC and Alkathene (made by ICI) may also be used, but presently VX329 is preferred for its performance and the simplicity of injection moulding which is possible for PVC. Cold setting materials are not as convenient for large scale production although suitable final properties may be obtained.

The optimum shape for the lips of the seal, to minimise contact area and prevent inversion, is for the internal bore to be tapered so that the tip of the lips nearly or just contact the fibre package: it is possible for there to be virtually no contact in the absence of pressure. The outer surface of the lips (which face inwardly of a feed head) are tapered such that at the point of contact the material is very thin. This provides sufficient flexibility to enable the pressure inside the head to urge the lips into sealing contact. In order to avoid inversion the angle of taper is large to retain strength against inversion. It has been found that for an optical fibre transmission line comprising seven fibres (or possibly five fibres and two electrical conductors) enclosed in a low density coating suitable for fibre blowing and having an average diameter of 2 mm, BPI VX329 grade PVC provides a suitable seal when the minimum inside diameter of the lip portion of the seal is 2 mm and the outer diameter of the lip portion is 2.9 mm. This seal operates well in the range of 300 to 1300 KPa. For thinner transmission line packages a seal of similar material and outer dimensions but lesser internal diameter, eg 1.6 mm for 1.6 mm packages, is also satisfactory. For very thin or delicate fibre packages the seal may be made of softer material, for example for a single fibre package, and this may be complemented by using a lower air pressure. Alternatively a plurality of thin packages may be passed through the same bore and installed simultaneously. The outside diameter of the main body of the seal is preferably in the range of 6 to 10 mm, or less. It is envisaged that seal of this type may also be used for other applications where a moving fibre unit or package needs to be sealed across a pressure differential. In particular the seal may be incorporated into other types of feedheads for fibre blowing to reduce leakage. Multi bore or manifold seals may also be provided for multiple installations.

The apparatus and method described herein may be used for installation of transmission lines other than the described optical fibre packages and in some instances a special packaging may not be required. The transmission line may comprise metallic conductors or metallic conductors may be included in an optical fibre package for fluid drag installation. A plurality of transmission lines may be installed in a single duct, either sequentially or in the same blowing operation. Pulsed fluid input and/or pulsed venting may be utilized; in particular pulsed venting, with the pulse rate controlled to increase or decrease the degree of venting, may be utilised in an automaticaly controlled system, for example with an electrically pulsed bleed valve.

Although the provision of the seal 4 renders the apparatus more efficient in terms of eliminating backwards leakage of air along the fibre, the fibre may be introduced to the duct via a closely fitting tube 8 attached to an end plate 9 as shown in FIG. 3.

It is found that fibre packages exhibit a varying degree of 'blowability', that is some nominally similar packages achieve greater installation distances under the same blowing conditions than other packages. A technique for measuring the blowability is for the fibre to be blown along a short duct and for a retarding force to be applied, the force registered for a given blowing strenght or the blowing strength required for a given force being measured to indicate blowability. Such a system may be incorporated on a production line to grade or quality control the package. The apparatus for this test may comprise a blow and vent arrangement, although the vent may be constituted by the end of the tube. Similar testing may be applied using a liquid fluid medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A process for installing a transmission line in a passageway by means of viscous drag of a fluid, so that the transmission line extends between a transmission line inlet to the passageway and a transmission line outlet remote from the inlet, the method comprising admitting fluid at an upstream end of the passageway to advance the transmission line along the passageway from the inlet towards the outlet, and discharging some of the fluid from the passageway at a location intermediate the inlet and outlet during at least part of the installation process, and whereby the transmission line continues to advance along the passageway to the outlet by means of viscous fluid drag forces acting thereon in the passageway downstream of said location.

2. A process according to claim 1 in which the rate of discharge of fluid is varied during the advancement of the transmission line.

3. A process according to claim 1 or claim 2 in which the rate of discharge is controlled to reduce the rate as the transmission line is advanced into the passageway.

4. A process according to claims 1, 2, or 3 in which, before the transmission line reaches the outlet, the discharge of fluid ceases when the transmission line has advanced a predetermined distance into the passageway.

5. A process according to claims 1, 2 or 3 in which fluid is admitted at one or more intermediate locations along the passageway after the transmission line has that location.

6. A process according to claims 1, 2, or 3 in which fluid is discharged from one or more intermediate locations along the passageway prior to travel of the transmission line past that location, and thereafter no fluid is discharged from the location during the installation.

7. A process according to claim 4 in which fluid is admitted at one or more intermediate locations along the passageway after the transmission line has passed that location.

8. A process according to claim 4 in which fluid is discharged from one or more intermediate locations along the passageway prior to travel of the transmission line past that location, and thereafter no fluid is discharged from the location during the installation.

9. A process according to claim 5 in which fluid is discharged from one or more intermediate locations along the passageway prior to travel of the transmission line past that location, and thereafter no fluid is discharged form the location during the installation.

10. A process for installing an optical fibre transmission line in a passageway by means of viscous drag of a gas, as that the optical fibre transmission line extends between a transmission line inlet to the passageway and a transmission line outlet remote from the inlet, the method comprising admitting gas at an upstream end of the passageway to advance the optical fibre transmission line along the passageway from the inlet towards the outlet, and discharging some of the gas from the passageway at a location intermediate the inlet and outlet during at least part of the installation process, and whereby the optical fibre transmission line continues to advance along the passageway to the outlet by means of viscous drag forces acting thereon in the passageway downstream of said location.

11. A process according to claim 8 wherein the gas is admitted into the passageway at a pressure of no more than 10 bar.

12. A process according to claim 10 or claim 11 wherein the optical fibre transmission line is installed at a rate of between 50 and 100 meters a minute.

13. A process according to claims 10 or 11 wherein the optical fibre transmission line has a diameter of between 1.6 and 2 mm.

14. A process according to claims 10 or 11 wherein the optical fibre transmission line comprises a single optical fibre.

15. A process according to claim 12 wherein the optical fibre transmission line comprises a single optical fibre.

16. A process according to claim 12 wherein the optical fibre transmission line has a diameter of between 1.6 and 2 mm.

17. A process according to claim 13 wherein the optical fibre transmission line comprises a single optical fibre.

* * * * *